United States Patent
Tran et al.

(10) Patent No.: US 11,646,013 B2
(45) Date of Patent: May 9, 2023

(54) HYBRID CONVERSATIONS WITH HUMAN AND VIRTUAL ASSISTANTS

(71) Applicant: International Business Machines Corporation, Armonk, NY (US)

(72) Inventors: Khoi-Nguyen Dao Tran, Southbank (AU); Jingshi Li, Yarralumla (AU); Mukesh Kumar Mohania, Waramanga (AU); Jaysen Ollerenshaw, Kaleen (AU)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 16/729,876

(22) Filed: Dec. 30, 2019

(65) Prior Publication Data

US 2021/0201896 A1 Jul. 1, 2021

(51) Int. Cl.
*G10L 15/16* (2006.01)
*G10L 15/22* (2006.01)
*G10L 15/18* (2013.01)

(52) U.S. Cl.
CPC .......... *G10L 15/16* (2013.01); *G10L 15/1815* (2013.01); *G10L 15/1822* (2013.01); *G10L 15/22* (2013.01); *G10L 2015/223* (2013.01)

(58) Field of Classification Search
CPC . G10L 15/16; G10L 15/1815; G10L 15/1822; G10L 2015/223; G06Q 30/0203; G06Q 30/016; G06Q 30/01
See application file for complete search history.

(56) References Cited

U.S. PATENT DOCUMENTS

| 9,848,082 | B1* | 12/2017 | Lillard | H04M 3/5231 |
| 10,079,013 | B2 | 9/2018 | Kalns et al. | |
| 10,178,218 | B1 | 1/2019 | Vadodaria | |
| 10,972,606 | B1* | 4/2021 | Caldwell | H04M 3/5191 |
| 11,218,429 | B2* | 1/2022 | Yun | H04L 51/16 |
| 2009/0245500 | A1 | 10/2009 | Wampler | |
| 2014/0129651 | A1 | 5/2014 | Gelfenbeyn et al. | |

(Continued)

OTHER PUBLICATIONS

Dimitrois Rafailidis and Yannis Manolopoulos, "The Technical Gap Between Virtual Assistants and Recommendation Systems," arXiv:1901. 00431v2 [cs.IR] Jan. 6, 2019, 6 pages.

(Continued)

*Primary Examiner* — Paras D Shah
*Assistant Examiner* — Athar N Pasha
(74) *Attorney, Agent, or Firm* — Patterson + Sheridan, LLP

(57) ABSTRACT

In some examples, a user, either a customer or potential customer of a business, engages in conversations with a virtual assistant (VA) provided by the business. The virtual assistant (VA) is further supported by one or more human assistants (HA), if needed. In embodiments, to facilitate seamless transitions between a VA and a HA, when needed, an intelligent decision maker (IDM) is provided. The IDM receives a user question and a proposed answer to the question from a VA, evaluates the proposed answer in the context of the conversation, and determines if the proposed answer requires further review by an HA. In response to a determination that the proposed answer requires further review, the IDM sends the proposed answer to an HA, and, in response to an indication by the HA, takes further action in the conversation.

20 Claims, 5 Drawing Sheets

(56) References Cited

U.S. PATENT DOCUMENTS

| | | | | |
|---|---|---|---|---|
| 2015/0347900 | A1* | 12/2015 | Bell | G06N 5/02 |
| | | | | 706/11 |
| 2017/0339274 | A1* | 11/2017 | Odinak | H04M 3/5183 |
| 2018/0341685 | A1* | 11/2018 | Indyk | G06F 16/90332 |
| 2020/0105273 | A1* | 4/2020 | O'Donovan | G10L 15/30 |
| 2020/0193095 | A1* | 6/2020 | Fan | G06N 3/0454 |
| 2020/0410506 | A1* | 12/2020 | Jones | G06Q 10/063112 |
| 2021/0042787 | A1* | 2/2021 | Kleber | H04L 9/085 |
| 2021/0117213 | A1* | 4/2021 | Chen | H04L 65/4046 |
| 2021/0151056 | A1* | 5/2021 | Trim | H04L 41/0806 |

OTHER PUBLICATIONS

Sunhwan Lee, Robert Moore, Guang-Jie Ren, Raphael Arar, Shun Jiang, "Making Personalized Recommendation through Conversation: Architecture Design and Recommendation Methods," 2018, www.aai.org, 4 pages.

Disclosed Anonymously, "Method and System for Intelligently Presenting Reference Content to Users during conversation," IP.com No. IPCOM000258148D, IP.com Electronic Publication Date: Apr. 12, 2019, 3 pages.

Disclosed Anonymously,"Crowdsourced market research and survey completion using intelligent conversational assistants," IP.com No. IPCOM000256850D, IP.com Electronic Publication Date: Jan. 4, 2019, 8 pages.

Disclosed Anonymously, "Seamless Virtual Assistant Information Feed," IP.com No. IPCOM000235580D, IP.com Electronic Publication Date: Mar. 10, 2014, 4 pages.

Hongshen Chen, Xiaorui Liu†, Dawei Yin, and Jiliang Tang, "A Survey on Dialogue Systems: Recent Advances and New Frontiers," arXiv:1711.01731v3 [cs.CL] Jan. 11, 2018, 13 pages.

Parth Shrivastava, "Bot + Human Hybrid: The New Era of Customer Support," Chatbots Magazine, Dated: Jan. 12, 2018, Date Accessed: Nov. 2, 2022, pp. 1-4.

* cited by examiner

ND VIRTUAL ASSISTANTS

HYBRID CONVERSATIONS WITH HUMAN AND VIRTUAL ASSISTANTS

BACKGROUND

The present invention relates to automated conversation systems, and more specifically to hybrid conversations with both human and virtual assistants.

Current conversation systems are designed to be fully automated. In such systems, companies attempt to create exhaustive conversation paths for their customers. While this often takes care of the most common customer needs, often there are complex queries where a human assistant is needed. In these cases, conversation systems are designed to fail gracefully and direct the customer to other sources for human assistance. Or, for example, the customer is put in a queue where he or she waits for a human assistant. The current systems have tradeoffs that inconvenience the customer, such as the limited serviceability of virtual assistants and the limited availability of human assistants.

It is useful to provide solutions to these problems of current conversation systems.

SUMMARY

According to one embodiment of the present disclosure, a method is provided. The method includes receiving a user question and a proposed answer from a conversation managed by a virtual assistant (VA), evaluating the proposed answer in the context of the conversation and determining if the proposed answer requires further review by a human assistant (HA). The method further includes, in response to a determination that the proposed answer requires further review, sending the proposed answer to an HA for review, and, in response to an indication from the HA, taking further action in the conversation.

According to a second embodiment of the present disclosure, a system is provided. The system includes a user interface configured to receive a question from a user and provide a corresponding answer to the user, and one or more virtual assistants (VAs), coupled to the user interface, to propose an answer to the user question. The system further includes, a conversation evaluator, coupled to the VAs and to the user interface, configured to evaluate the proposed answer in a context of the conversation, determine if the proposed answer requires further review by an HA, and, in response to a determination that the proposed answer requires further review, send the proposed answer to an HA for review.

According to a third embodiment of the present disclosure, a computer-readable storage medium is provided. The computer-readable storage medium has computer-readable program code embodied therewith, the computer-readable program code executable by one or more computer processors to perform an operation. The operation includes receive a user question and a proposed answer from a conversation managed by a virtual assistant (VA), evaluate the proposed answer in a context of the conversation and determine if the proposed answer requires further review, and in response to a determination that the proposed answer requires further review, send the proposed answer to an HA for review. The operation further includes to take further action in the conversation, in response to an indication from the HA, such as, for example, to provide an answer as modified by the HA to the user, or cause the VA to cease responding altogether, if the HA takes over the conversation.

DETAILED DESCRIPTION

Figure 1:
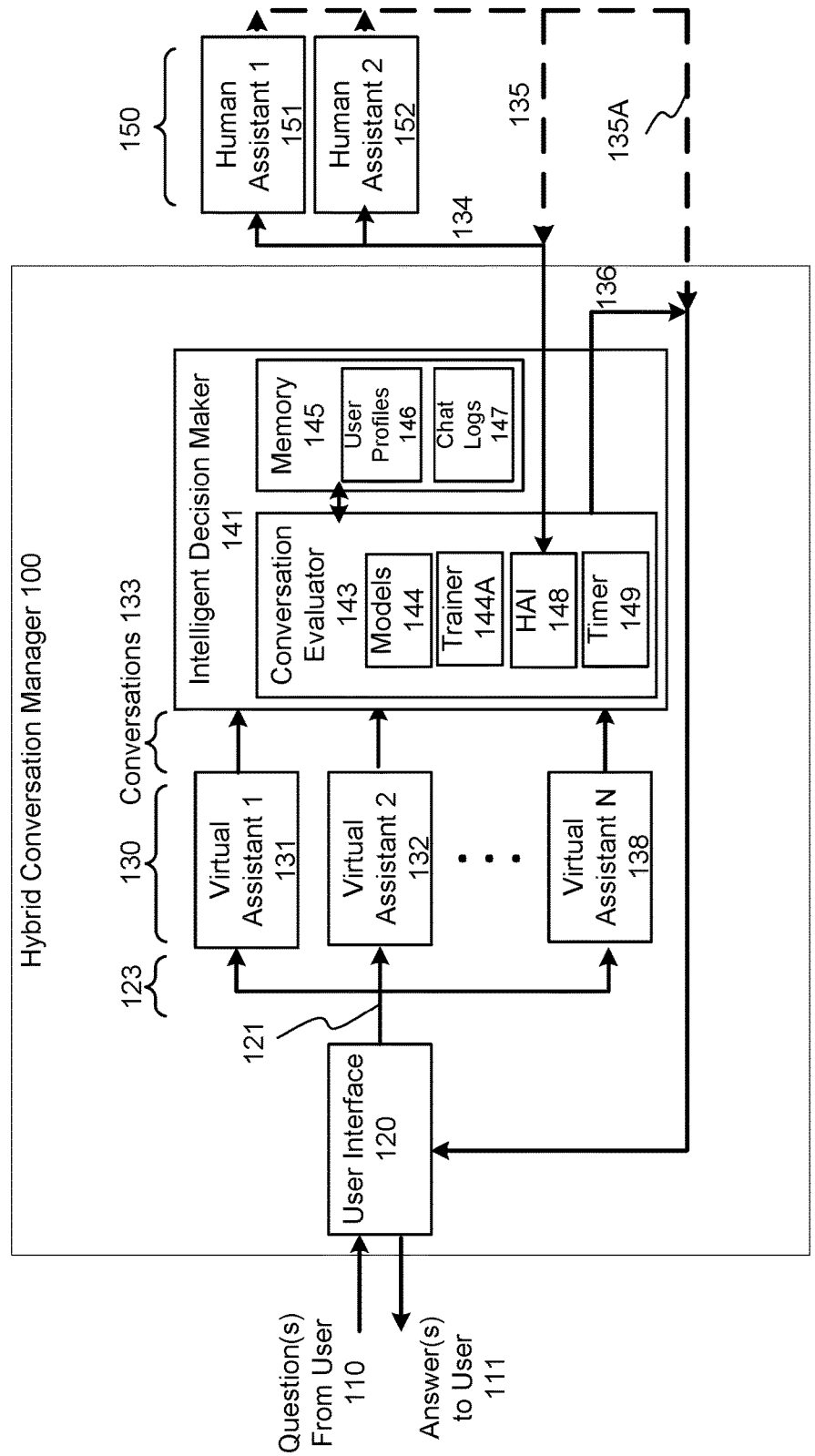
FIG. 1 illustrates a schematic drawing of an example system, according to one embodiment disclosed herein.

Embodiments and examples described herein relate to a hybrid conversation system where human and virtual assistants can seamlessly participate in a conversation with a user, depending on the user's needs, their profile, and the flow of the conversation. In one or more embodiments, an example system is configured to leverage the benefits of both HAs and VAs in conversation systems. These include, for example, on the one hand, the on-demand availability of VAs, and on the other hand, the ability of HAs to handle all types of queries. In some embodiments a targeted scenario may be a customer portal at a company's website, where customers first encounter a VA. As the customer chats with the VA, an intelligent decision maker continuously analyzes the chat and develops a customer profile, which may include any previous chats. Based on a configuration, which may include, for example, a customer's profile and business rules, in one or more embodiments a customer is assigned a priority. The priority may reflect a high likelihood that the user of the chat is a paying customer, a premium customer, or a customer in an executive role.

Additionally, in one or more embodiments, an urgency rating and summary may also be dynamically created for the conversation. The urgency rating reflects how necessary it appears to be that an HA intervene into the VA's conversation with the user, and may be a function of, for example, the complexity of the user's inquiries, user complaints, of the VA simply being unfamiliar with technology that the user is asking about. For example, in a customer assistance conversation, where a user has purchased a complicated piece of equipment, and cannot figure out how to use it, or feels that something is wrong with the machine. In one or more embodiments, the priority, urgency rating and summary provides an intelligent assessment of the customer in the context of the business configuration accurately to determine the need to have a HA review the conversation, potentially modify one or more answers proposed by the VA, or, if needed, take over the conversation completely.

Thus, in one or more embodiments, the missed opportunities that occur when customers engage with a wholly autonomous conversation system may be avoided.

It is noted that in the VA realm there are many stories regarding the failure of VAs (also known as "chatbots", and sometimes so referred to herein) based on the fact that they do not have sufficient intelligence to address the diverse range of customer queries. This results in the business using the VA losing potential customers, or having dissatisfied and unengaged customers, eventually leading to churn. It is therefore imperative that such missed opportunities in chat-bot conversations are identified in real time, and the customer routed to a qualified HA to pick up the slack. Using one or more embodiments as disclosed herein, companies may scale out their customer support operations through the use of VAs, but at the same time maintain the quality of the experience by identifying opportunities where an HA can make a significant impact to the customer engagement. In one or more embodiments, this may be accomplished using a hybrid conversation manager, that includes an intelligent decision maker configured to know when to ask an HA to step in.

Thus, in one or more embodiments, a conversation interface is provided that allows an HA or a VA to interject at any time, with interjection control performed by the HA. Logs of each conversation are continuously monitored and analyzed, by means of which new conversation paths and examples can be extracted to further improve the conversation capabilities of the VA.

In embodiments, in the event that a given VA completely fails the address the needs of a customer, or the customer cannot progress, and there are no HAs then available, the VA may engage a contextual filler conversation system to keep the user engaged. For example, in such a situation the VA may say "I need advice from specialist. I've just sent a request." and then engage in other conversation topics such as "did you need help with something else" or "have you used our product X?"

Thus, in one or more embodiments it is necessary to have HAs available when needed. In some embodiments, in order to keep a pool of active supporting HAs an incentive system may be implemented, where additional bonus pay for an HA is dynamically adjusted depending on the available trained HAs and the quantity and quality of service that each HA delivers.

FIG. 1 illustrates a schematic drawing of an example system 100, according to one embodiment disclosed herein. With reference to FIG. 1 there is shown hybrid conversation manager 100, configured to implement one or more embodiments of hybrid virtual assistant and human assistant conversations. Hybrid conversation manager 100 includes user interface 120 which receives questions from a user 110 and also provides answers 111 to the user. The user may be, for example, customer or prospective customer of a business. The business supports online automated conversations for users to engage with it, and most of these conversations are handled by a VA. However, for instances when a VA simply cannot provide a satisfactory answer, in one or more embodiments, the business may implement an intelligent decision maker 141 to automatically monitor conversations and call in HAs when needed.

User interface 120 is connected to a set of VAs 130, via links 121. The set of VAs may include a single VA, but in the depicted example there are N VAs shown, namely VA 1 131, VA 2 132 and on through VA N 138. Having a set of VAs allows for different calls to be routed to a VA specialized to respond to user queries in a given knowledge domain. This may be particularly useful when the business is large and provides a wide range of goods and services. In one embodiment, one of the VAs engages in a conversation with a user. As part of that conversation the user submits a series of questions 110, and the VA assigned to the conversation, in response to each user question 110, proposes an answer. In one or more embodiments, the VAs may be local to the hybrid conversation manager 100, or, for example, they may be in the cloud, and thus communications links 123 and 130 are links that run through a data communications network. Similarly, links 110 and 111 may be, and generally are, through a data communications network, where a user accesses the business' website to carry on a chat. Finally, hybrid conversation manager 100 may also be remote, for example, from one or more of HAs 150, who may also communicate with the hybrid conversation manager 100 over a data communications network.

Continuing with reference to FIG. 1, the set of VAs 130 are coupled to intelligent decision maker (IDM) 141. IDM 141 continuously monitors, through conversation evaluator 143, each conversation between a user and a VA 130. Moreover, the chat logs 147 of all VA conversations, originally generated and stored within each VA 130, are saved in a memory 145 of IDM 141, described more fully below. In embodiments, saving the chat logs 147 allows for the extraction of new conversation paths and examples, which may, in some embodiments, be used to better train the VAs and thereby improve their conversational capabilities. Additionally, in embodiments, the chat logs 147 may also be used to train models 144, also described below, which the conversation evaluator 143 uses in referring, or deciding to refer, a proposed VA answer to an HA for review.

As shown in FIG. 1, IDM 141 includes conversation evaluator 143 and memory 145. Conversation evaluator 143 includes models 144, trainer 144A, human assistant interface (HAI) 148, and timer 149. These elements of IDM 141 are next described.

Conversation evaluator 143 analyzes each conversation between a VA and a user, in the context of the conversation, using a hybrid of statistical and rule-based models 144. In one or more embodiments, these models may be specified by, for example, an administrator. For example, there may be a rule that stipulates that a VA issuing three "I don't know" responses in a row in any conversation requires an HA to review the response. This is because, for obvious reasons, it may likely indicate that the VA is out of its depth, and lacks sufficient knowledge to continue to meaningfully respond to the user's queries. Thus, for example, in that example scenario, IDM 141 by virtue of monitoring the conversation is aware that two "I don't knows" have already been issued. The third "I don't know" then appears as the VA's next proposed answer. Upon seeing this next proposed answer, IDM 141, following the rule, sends the conversation to an HA for review.

Figure 3:
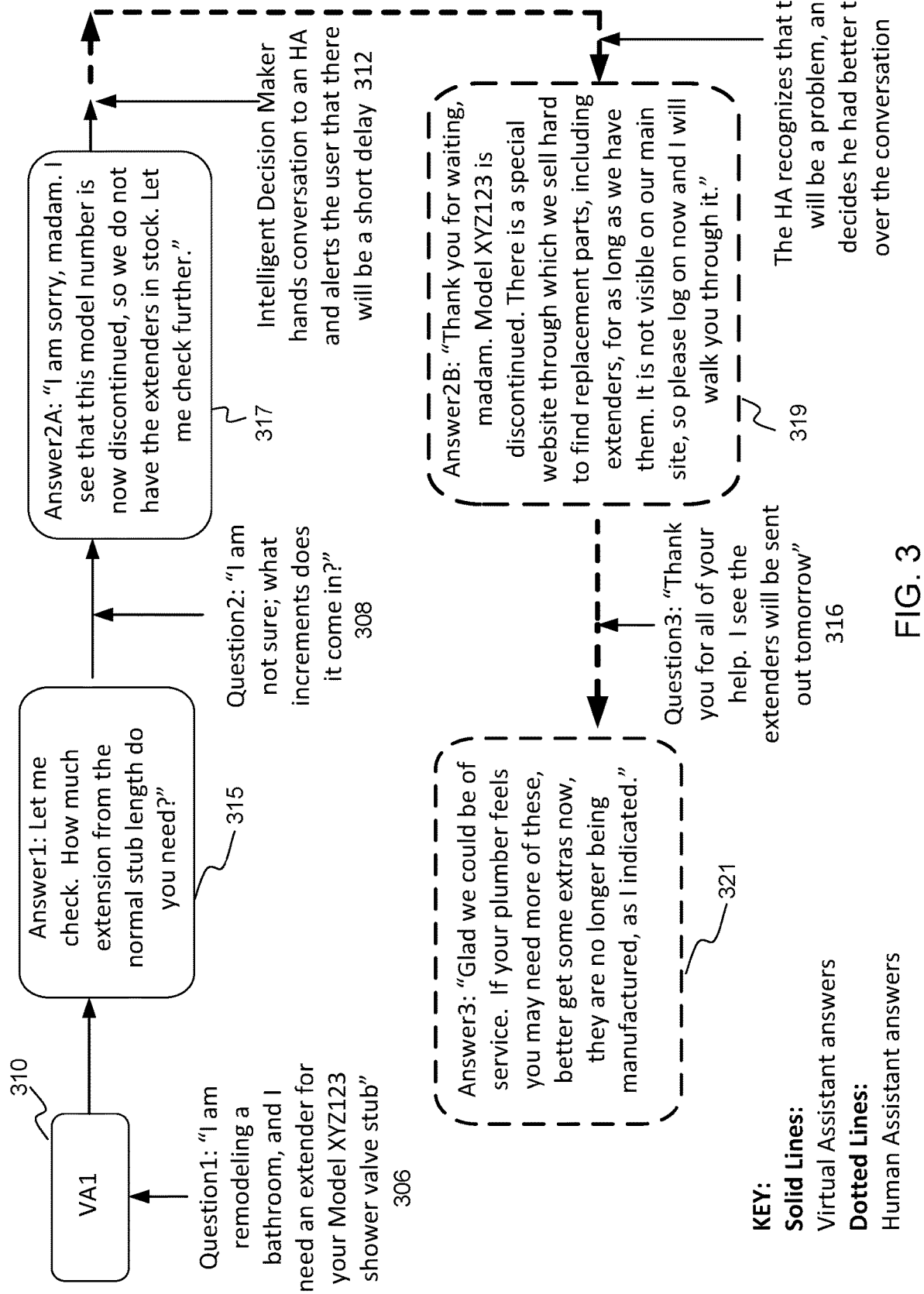
FIG. 3 illustrates an example hybrid VA-HA conversation, where the HA eventually takes over the entire conversation, according to one embodiment disclosed herein.

Another similar example may be one that defies being expressed in a single rule, but that, if the conversation is properly analyzed, it is clear that an HA should be flagged. This may occur, for example, when the VA uses a semantically similar term to "I don't know" and, in context of the conversation thus far, it is also clear that the VA lacks sufficient knowledge to adequately respond to the user's query. This latter example is illustrated in FIG. 3, described in detail below. In this latter example, it is hard to craft a hard and fast rule to capture the VA coming very close to the edge of its knowledge base. Thus, in some embodiments, models 144 may include one or more statistical models, such as, for example, machine learning classification models that use deep neural networks or support vector machines, that are trained to predict when a VA is no longer able to handle a conversation, and to flag an HA for review. In one or more embodiments, these models may be trained, at least in part, by trainer 144A.

In one or more embodiments, in making its decision, IDM 141 may also take into account a user's priority determined from a user configuration or user profile 146, as well as an urgency determined from the quality of the conversation itself. For example, different types of users may contact a VA for information. Some of these are actual customers, some are important customers, and some are not yet customers. Thus, in one or more embodiments, as a user chats with the VA, for example VA 131, IDM 141 continuously analyzes the chat and develops a user profile 146, including any previous chats with that user, which, in one or more embodiments, are stored in chat logs 147. Based on the user configuration, which may include, for example, a user profile 146 and be determined in part by business rules, the user is assigned a priority. Some examples of priorities may include "high likelihood of conversation to a paying customer", "premium customer", or "a customer in an executive role", etc., each of which would have a higher priority than a regular customer, or than someone "just looking."

Additionally, in one or more embodiments, an urgency rating and summary is also dynamically created for the conversation. This is so that an on call HA may prioritize their intervention into a VA's conversation as a function of, for example, complexity of user inquiries, user complaints, or, for example, the VA's unfamiliarity with the technology being discussed. In one or more embodiments, the priority score, and the urgency rating and summary provide the IDM 141 with an intelligent assessment of the user in the context of the business configuration to determine if there is a need to handover the conversation to an HA for review.

In one or more embodiments, once the IDM 141 determines that the VA's proposed response requires further review, it flags the response to an HA 150 for further evaluation. IDM 141 is thus coupled to HA 1 151 and HA 2 152 (in the example of FIG. 1; in embodiments, there may be more or less HAs in the set of available HAs 150) through HAI 148, which sends and receives messages and data to and from HAs 150 over communication links 134. As noted above, the HAs may be remote from the IDM 141, and thus communications links 134 and 135 may be over a data communications network.

In one or more embodiments, IDM 141 sends the proposed VA response, with the context of recent parts of the conversation (e.g., the summary), a user priority and an urgency, under a response timer. The timer is managed by timer 148 on IDM 141's side. In addition to sending the proposed VA response to the HA, IDM 141, at the same time, sends a message to the user through user interface 120 that additional time is required to process a response to the user's last question, so that the user is not left waiting and feeling ignored or underserved. The HA, for example HA 1 151 or HA 2 152, then reviews the response under the response timer, and makes a decision among three possible actions. These include, for example, to deliver the proposed response in its original form, to deliver a modified response, or to take over the conversation from the VA.

In the event that the HA cannot submit a response under the timer deadline, then IDM 141 will trigger a second timer, again managed by timer 149, which gives the option for the HA to either ask for still more time while continuing to work on the response, which will be relayed to the user, to take over the conversation completely, or to submit the original response as proposed by the VA. In one or more embodiments, if the second timer expires before the HA responds, the original VA proposed response is sent by IDM 141 to the user, and the interaction between IDM 141 and the HA logged in a chat log for the conversation, such as, for example, in chat logs 147.

However, if the HA can make a decision within either the first timer or the second timer, then, in one or more embodiments, if it is approving the proposed response as is, or if it is modifying the response, that data is sent back to IDM 141, via HAI 148, across communication links 134, for forwarding the chosen response to the user, through user interface 120. If, however, the HA decides to take over the conversation completely from the VA, then, in one or more embodiments, there are two options. A first option is to have the HA communicate directly with the user, via user interface 120, as shown by dashed communications link 135A, or, for example, the messaging can continue to run through IDM 14, through dashed communications link 135. In the latter case the HA's side of the conversation can be logged, for example in chat logs 147, and trainer 144A can later be used to train one or both of the VAs 130 and models 144 based on the log.

Figure 2:
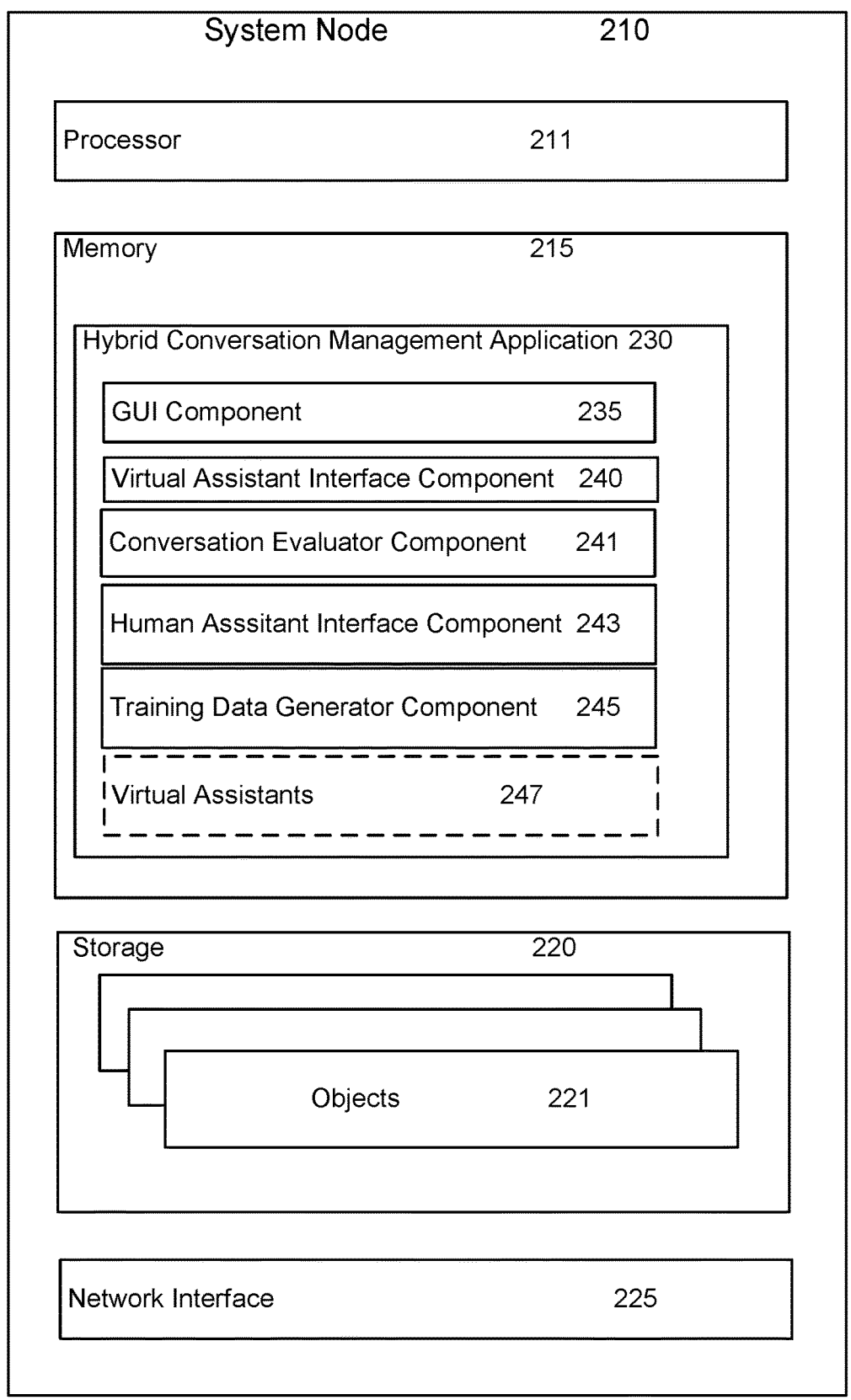
FIG. 2 is a block diagram illustrating a system node configured to provide hybrid VA-HA conversation management, according to one embodiment disclosed herein.

FIG. 2 is a block diagram illustrating a System Node 210 configured to provide hybrid conversation management according to one embodiment disclosed herein. System Node 210 is functionally equivalent to the hybrid conversation manager 100 schematically depicted in FIG. 1, but, for ease of illustration, without showing in FIG. 2 all of the detail, and all of the various internal (or external) communications pathways, depicted in FIG. 1.

In the illustrated embodiment, the system node 210 includes a processor 210, memory 215, storage 220, and a network interface 225. In the illustrated embodiment, the processor 210 retrieves and executes programming instructions stored in memory 215, as well as stores and retrieves application data residing in storage 220. The processor 210 is generally representative of a single CPU, multiple CPUs, a single CPU having multiple processing cores, and the like. The memory 215 is generally included to be representative of a random access memory. Storage 220 may be disk drives or flash-based storage devices, and may include fixed and/or removable storage devices, such as fixed disk drives, removable memory cards, or optical storage, network attached storage (NAS), or storage area network (SAN). Storage 220 may include one or more data bases, including IASPs. Via the network interface 225, the system Node 210 can be communicatively coupled with one or more other devices and components, such as cloud servers, other System Nodes 210, monitoring nodes, storage nodes, and the like.

In the illustrated embodiment, Storage 220 includes a set of objects 221. Although depicted as residing in Storage 220, in embodiments, the objects 221 may reside in any suitable location. In embodiments, the Objects 221 are generally representative of any data (e.g., application data, saved files, databases, training data and the like) that is maintained and/or operated on by the system node 210. Objects 221 may include user profiles of users of the conversation, chat logs of one or more of the conversations handled through the hybrid conversation management system, as well as summaries of conversations forwarded to the HAs for evaluating a proposed VA response, which may include a priority and an urgency calculated for a given user in a given conversation, all as described above with reference to FIG. 1.

Additionally, objects 221 may further include one or more models, including rule based as well as multivariate statistical models, or the like, which are trained to, and then used to, predict whether, given the priority of a user and the configuration and summary of a chat, a HA should be flagged for further review of a proposed answer by a VA to the pending query of a user in a current conversation. Thus, such models may include one or more statistical models, such as, for example, machine learning classification models that use deep neural networks or support vector machines, that are trained to predict when a VA is no longer able to handle a conversation, and to flag an HA for review. Objects 221 may still further include a set of training data used to train one or more of the predictive models, such as, for example, may be generated by a training data generator component 245 of hybrid conversation management application 230, as described more fully below with reference to FIG. 3. As illustrated, the memory 215 includes a hybrid conversation management application 230. Although depicted as software in memory 215, in embodiments, the functionality of the hybrid conversation management application 230 can be implemented in any location using hardware, software, firmware, or a combination of hardware, software and firmware. Although not illustrated, the memory 215 may include any number of other applications used to create and modify the objects 221 and perform system tasks on the System Node 210.

As illustrated, the hybrid conversation management application 230 includes a graphical user interface (GUI) component 235, a virtual assistant interface component 240, a conversation evaluator component 241, a human assistant interface component 243, a training data generation component 245, and, optionally, virtual assistants 247. Although depicted as discrete components for conceptual clarity, in embodiments, the operations and functionality of the GUI component 235, a virtual assistant interface component 240, a conversation evaluator component 241, a human assistant interface component 243, a training data generation component 245, and virtual assistants 247, if implemented in the system node 210, may be combined, wholly or partially, or distributed across any number of components. In an embodiment, the hybrid conversation management application 230 is generally used to analyze a proposed VA response to a user question in a conversation managed by the VA and decide whether the response should be forwarded to an HA for review and possible further action. In an embodiment, the hybrid conversation management application 230 is also used to train, via the training data generator component 245, the models used in evaluating a proposed VA response, as described above, to make the decision whether to forward the proposed response and associated data to an HA for review and possible further action.

In an embodiment, the GUI component 235 is used to provide user interfaces through which the VAs (or HAs, if they take over a conversation) communicate with users, so as to receive user questions and provide responses to those questions. In some embodiments, the GUI is, or is part of, a website maintained by the business. In some embodiments the GUI pops up as a user is browsing certain internal pages of the business' website, according to an algorithm that predicts when a user may want to ask a question, but is unaware there is a facility for a chat.

In the illustrated embodiment, the VA interface component 240 interfaces between the GUI component and the VAs, as well as between the VAs and the conversation evaluator component 241. As noted above, either of these interfaces maintained by VA interface component 240 may be over a data communications network, as the VAs may be remote form both users and the hybrid conversation management application 230. In the illustrated embodiment, the conversation evaluator component 241 receives user questions from the GUI component 235, as well as recent chat activity in the conversation and a current proposed answer form a VA, and decides, based on these inputs, and also based on a user configuration and user priority score that it dynamically generates, whether to, in response to a VA's proposed answer to the user question, refer the conversation to a HA, and to receive a response from the HA regarding further action, via the HAI component 243.

In the illustrated embodiment, the models used by the conversation evaluator component 241 to make its decision, may be trained by training data generated by training data generator component 245. As noted above, the training data may include user profiles and chat logs, and, more importantly, chat logs for conversations where the proposed VA response was referred to an HA, and where the HA either modified the response or took over the conversation. In the latter case, for example, the training data further includes the HA interaction with a user once that HA took over a conversation from the VA. As further noted above, the training data may also be used to train the Vas so as to improve their knowledge and their conversational abilities.

Finally, with reference to FIG. 2, in some embodiments, System Node 210 may communicate with both users and cloud servers, in which cloud based versions of the models may be stored, or in which VAs may be hosted, via Network Interface 225.

To better illustrate the context of one or more embodiments of the present disclosure, FIG. 3 illustrates a snippet of an example hybrid VA-HA conversation, according to one embodiment disclosed herein. In the example of FIG. 3, initially a VA responds to a user's question. However, given the VA's proposed response to the second question posed by the user, an example IDM forwards the proposed response to a HA. Upon reviewing the response and the conversation as a whole, the HA takes over the conversation. In FIG. 3 the user's questions and decisions by the IDM and the HA are indexed using even numbers, and the answers, whether provided by the VA or the HA, are indexed using odd numbers, and are provided in rounded corner boxes. Moreover, of these boxes, as indicated in the key to the figure, solid lined boxes denote the VA's answers and dashed lined boxes indicate the HA's answers. Finally, arrows connect the various boxes to indicate the direction of conversational flow.

With reference to FIG. 3, the snippet of the conversation as shown begins with Question1 at 306, posed by a user: "I am remodeling a bathroom, and I need an extender for your Model XYZ123 shower valve stub." To this VA1, who is handling this conversation, responds, with Answer1 at 315: "Let me check. How much extension from the normal stub length do you need?" The user follows this up with Question2 at 308: "I am not sure; what increments does it come in?" To this the VA seems not to be able to really answer the question, and proposes the following answer at 317: "I am sorry, madam. I see that this model number is now discontinued, so we do not have the extenders in stock. Let me check further." Prior to the proposed Answer at 317 being sent to the user, it is at this point in the conversation, at 312, that the IDM decides, given the recent activity in the conversation (e.g., a summary), the priority of the customer (e.g., she is an actual customer who has made a purchase of one of the business' valves), and the urgency of the conversation (e.g., the VA is getting into a very specific, somewhat uncommon area it does not have knowledge of), to hand the conversation to an HA for further review. At the same time, the IDM sends a message to the user that there will be a short delay.

It is here noteworthy that no specific rule was broken by the VA that triggered the scrutiny of the IDM. Rather, a few key inputs were at play at proposed Answer2A at 317, and these were used by one of the predictive models that the IDM had available to it (such as, for example, models 144 of FIG. 1), to sense a potential problem in the conversation. First, the VA used the term "let me check" at Answer1 315, followed by a more emphatic version of the statement, "let me check further" in its proposed Answer2A at 317. This indicates an acceleration of needed information not immediately available to the VA. Moreover, the subject of the conversation is Model XYZ123, which the proposed Answer2A notes is discontinued. Here the IDM knows that while a VA for the business has access to a current stock list, and can also tell if a given product has been discontinued via a notation on that list, the VA's knowledge stops there, as it does not have access to ways to find replacement parts or accessories for a discontinued product. The business simply did not think it a useful consumption of resources to train the VAs with this level of infrequently sought detail. Thus, the IDM knew that if the user presses for more information along that line of questioning, it is highly likely that she will become dissatisfied, and have a poor customer service experience. Thus, at 312, IDM refers proposed Answer2A to an HA for review. Because there may be a perceptible delay on the user's end, at 312 the IDM also sends the user a message that there will be a short delay.

Continuing with reference to FIG. 3, at 314, the HA, having reviewed the proposed response in the context of the conversation thus far, and thus verifying the automated decision made by the IDM, decides that the VA will not know much, if anything, about replacement parts for discontinued items, such as the requested Model XYZ123 extenders, or how to obtain them. Accordingly, as shown at 314, the HA decides to take over the conversation from the VA, so informs the IDM, and the VA, now advised by the IDM, ceases to respond to the user's questions. It is noted that in FIG. 3, once the proposed Answer2A was submitted to the HA, the arrows that indicate the direction of conversational flow change from solid arrows to slightly thicker dashed arrows, as shown. They remain of the thicker dashed type for the remainder of the chat, inasmuch as the entire chat is now in the HA's domain through to its end at Answer3 at 321.

Thus, at 319, the HA provides the actual modified Answer2B to the user's Question2 shown at 308. The HA tells the user, at Answer2B: "Thank you for waiting, madam. Model XYZ123 is discontinued. There is a special website through which we sell hard to find replacement parts, including extenders, for as long as we have them. It is not visible on our main site, so please log on now and I will walk you through it." Off-screen (not shown), the HA guides the user though a purchase of the extenders for the discontinued valve. Following Answer2B, and the subsequent purchase by the user, the user has a final question, Question3 at 316, which is actually a closing statement seeking a confirmation: "Thank you for all of your help. I see the extenders will be sent out tomorrow." HA responds with Answer3 at 321, which includes a final bit of advice: "Glad we could be of service. If your plumber feels you may need more of these, better get some extras now, they are no longer being manufactured, as I indicated." As may be surmised, this latter piece of advice is not likely to be offered by a VA, who does not have a full command of the relatively arcane subject matter of this chat. In embodiments, this entire snippet may be saved and highlighted to use in subsequent training of an IDM model or models.

Figure 4:
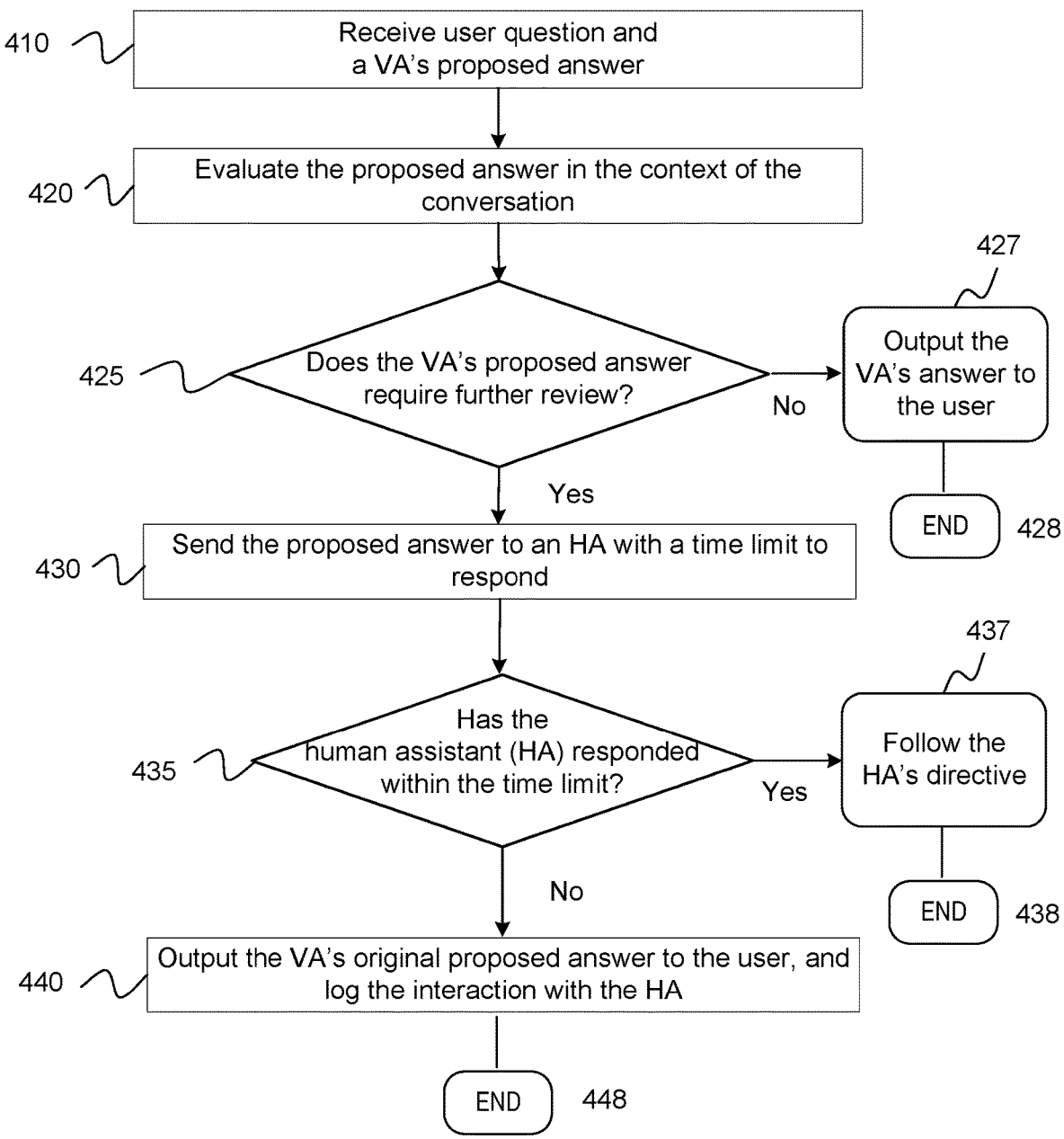
FIG. 4 depicts process flow of an example hybrid conversation management method, according to one embodiment disclosed herein.

FIG. 4 depicts process flow of an example hybrid conversation management method, according to one embodiment disclosed herein. Method 400 includes blocks 410 through 448. In alternate embodiments, method 400 may have more, or fewer, blocks. In one embodiment, method 400 may be performed, for example, by hybrid conversation manager 100 of FIG. 1, in particular intelligent assessment 141, or, for example, by system node 210 of FIG. 2, and in particular, hybrid conversation management application 230.

Continuing with reference to FIG. 4, method 400 begins at block 410, where a user's question and a VA's proposed answer is received. For example, the question may be Question2 of the user as shown at block 308 of FIG. 3, and the use may be a customer of the business, a plumbing manufacturer, who needs an accessory part for a faucet that she has previously purchased.

From block 410 method 400 proceeds to block 420, where the proposed answer is evaluated in the context of the conversation (e.g., summary, priority of user and urgency). For example, again with reference to FIG. 3, Question1 and its response Answer1 may be compared with Question2 and proposed Answer2A to catch any acceleration of lack of knowledge on the part of the VA, as described above.

From block 420, method 400 proceeds to query block 425, where it is determined if the VA's proposed answer requires further review. If a "No" is returned at query block 425, and the VA's proposed answer is not predicted by an example IDM, using the models available to it, and a calculated priority score and urgency, to require further review by an HA, then method 400 moves to block 427, where the VA's original proposed response is output to the user, and method 400 then ends at block 428.

If, however, the return to query block 425 is a "Yes", and thus the IDM predicts that there is enough uncertainty in the VA's knowledge level to provide a satisfactory answer to the user, then method 400 proceeds to block 430, where the VA's proposed answer is sent to an HA with a time limit to respond. In some embodiments, at this juncture a message may also be sent to the user advising that there will be a slight delay in providing them with an answer, as shown, for example, in FIG. 3 at 312.

From block 430, method 400 proceeds to query block 435, where it is determined if the HA has responded within the time limit provided to it at block 430. In real world embodiments there may actually be multiple time limits, as described above, and thus, as an example, the IDM will always offer a second time limit to an HA at this juncture, and may be requested to provide a third time limit, if the HA is still working on preparing an answer. However, for ease of description, all of the available time limits, which may be three, are treated as a single overall time limit in FIG. 4, to illustrate what happens when the last time limit has expired and the HA has not yet responded. In one or more embodiments, this is a useful backstop against human error on the part of the HA, or, for example, against a communications path going down so that a remote HA cannot provide any response to an example IDM, which may reside in the cloud, for example.

Thus, the return to query block 435 is a "Yes", and thus the HA has responded prior to the expiry of the time limit, then method 400 moves to block 437, where the HA's directive is followed, whatever it may be, such as, for example, to output a modified response to the user, and method 400 then ends at block 438. If, however, the return to query block 435 is a "No", and thus the HA has not responded prior to the expiry of the time limit, then method 400 moves to block 440, where, as a default, in absence of any decision by the HA, the VA's original proposed answer is output to the user, and the interaction with the HA at blocks 425, 430, 435 and 440 is logged and made a part of the chat log for this conversation. Method 400 then ends at block 448.

It is noted that in the above description, at each of blocks 428, 438 and 448, method 400 ended. That is because method 400 only describes a single round of the conversation, based on a single proposed VA's answer for which a decision to refer or not is made. In other versions of the method 400, at each of blocks 428, 438 and 448 process flow may return to block 410, for continued monitoring of the next proposed answer in the chat. Such a continued monitoring example is shown in FIG. 5, next described.

Figure 5:
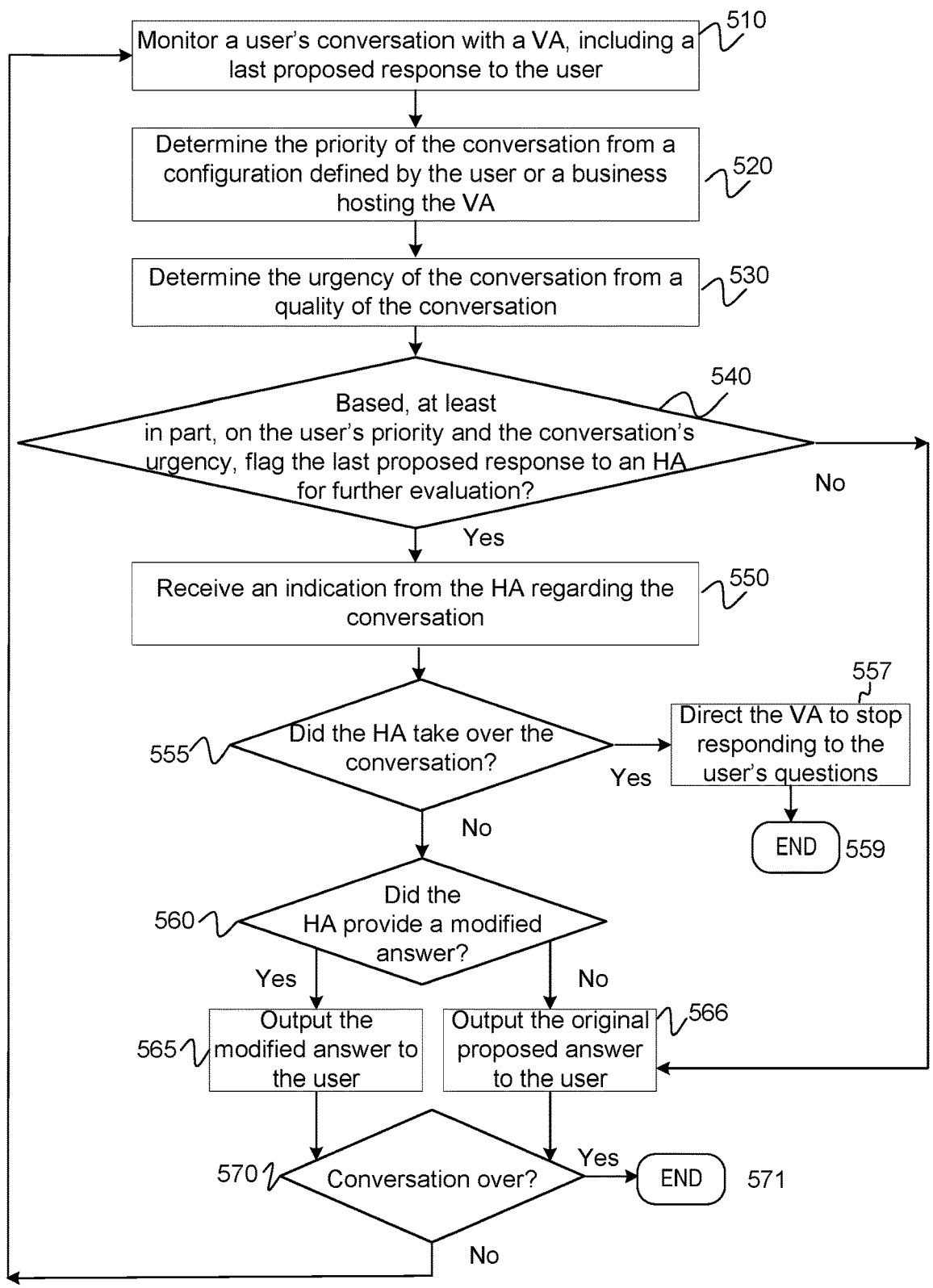
FIG. 5 depicts process flow of an alternate example hybrid conversation management method, according to one embodiment disclosed herein.

FIG. 5 depicts a process flow diagram of an alternate example hybrid conversation management method, according to one embodiment disclosed herein, where an IDM, for example, decides to refer a proposed answer to an HA for review, and various possible indications are received form the reviewing HA. Method 500 includes blocks 510 through 571. In alternate embodiments, method 500 may have more, or fewer, blocks. In one embodiment, method 500 may be performed, for example, by hybrid conversation manager 100 of FIG. 1, or, for example, by IDM 141 of FIG. 1, or, for example, system node 210 of FIG. 2.

Continuing with reference to FIG. 5, method 500 begins at block 510, where a user's online conversation with a VA is monitored, including a last proposed response to the user by the VA. From block 510 method 500 proceeds to block 520, where the priority of the conversation is determined from a configuration defined by the user or a business hosting the VA. For example, the priority may be expressed as a score on a pre-defined scale.

From block 520, method 500 proceeds to block 530, where an urgency of the conversation is determined from a quality of the conversation. For example, as described above with reference to FIG. 3, if the VA repeats a phrase indicating lack of knowledge two or more times, with additional emphasis on the second utterance of the phrase, such as "let me check" and then "let me check further", or, for example, as described above, the VA responds to three sequential user questions with "I don't know", the urgency is rather high, and a cause for potential concern. Or, for example, even if there are not three sequential expressions of lack of knowledge, but, for example, there are N "I don't know" (or its semantic equivalent) containing responses within, say, the last N+K answers output by the VA, where K is a pre-defined integer specific to the VA, here as well the urgency is rather high, and a cause for potential concern.

From block 520, method 500 proceeds to query block 540, where it is determined, based at least in part on the user's priority and the conversation's urgency, whether to flag the VA's last proposed response to an HA for further evaluation. If the return at query block 540 is a "No" then the VA's proposed response is fine, and there is no reason to involve an HA. In that case method 500 proceeds all the way to block 566, described below, where the VA's proposed response is output to the user without any HA intervention. If, on the other hand, the return at query block 540 is a "Yes" then method 500 proceeds to block 550, where an indication is received form the HA regarding further action in the conversation. As noted above, the further action may be to output the VA's original answer, output a modified answer, or have the HA completely take over the conversation with this user. All three possibilities are tested for and appropriate actions taken, as shown in blocks 557, 565 and 566. These are next described.

From block 550, method 500 proceeds to query block 555, where it is determined if, in its response, the HA decided to take over the conversation. If the return to query block 555 is a "Yes", then method 500 proceeds to block 547, where the VA is directed to stop responding to the user's questions in this chat. Because the HA has taken over, there are no additional VA proposed responses, and method 500 ends at block 559. That does not mean the IDM ceases to log the interaction between the HA and the user, though, as noted above, it just means that the VA is no longer involved.

If, however, a "No" is returned at query block 555, and the HA has not taken over the conversation, then the VA remains involved, it being a matter of whether the VA's original proposed response is sent to the user, or a modified one. Thus, method 500 proceeds to a second query block, namely query block 560, where it is determined if the HA provided a modified answer. If the return to query block 560 is a "Yes", then method 500 proceeds to block 565, where the said modified answer is out put to the user. If, however, the return to query block 560 is a "No", then method 500 proceeds to block 566, where the VA's original answer is output to the user. Method 500 then proceeds in parallel from blocks 565 and 566 to a final query block 570, where it is determined if the conversation is over. If it is, and the return to final query block 570 is a "Yes", then method 500 proceeds to block 571, and method 500 ends. If, however, the return to query block 570 is a "No", and the conversation is not over, and thus the user has additional questions, because at block 545 the HA did not take over the conversation, the VA is still handling it, and process flow returns to the beginning, at block 510 where method 500 starts anew.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the present disclosure, reference is made to one or more embodiments. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a web-based virtual assistant through a website. The website is likely hosted in the cloud. The website supports virtual chats, which, when necessary, may seamlessly change to conversations where human assistants write the chat responses. The HA may be at an operations center of the business where the business' website is managed by an IT staff, but the operations center may or may not be where the website is actually hosted, or where the VAs are hosted, which may or may not be the same servers where the website is hosted. Moreover, the HAs may themselves be remote are generally remote from the operations center and the VAs. Moreover, in some embodiments, the IDM may be remote from the business' website, and may also be remote from the models accessed by the IDM to make decisions, for example. Thus, some or all of the various and several elements of an entire hybrid VA-HA conversation management system as shown in FIG. 1 may each be remote from all of the others, and thus each element connected to one or more of the other elements over the cloud.

While the foregoing is directed to embodiments of the present invention, other and further embodiments of the invention may be devised without departing from the basic scope thereof, and the scope thereof is determined by the claims that follow.

What is claimed is:

1. A computer-implemented method to manage a real-time conversation, the computer-implemented method comprising:
designating a virtual assistant to answer a question received from a user, wherein the virtual assistant is associated with an application, and wherein the virtual assistant is trained using machine learning;
receiving a proposed response generated by the virtual assistant;
prior to outputting the proposed response, evaluating, in real time by the application using a machine learning classification model and when executed by one or more processors, the proposed response in a context of the real-time conversation to determine if the virtual assistant is incapable of answering the question, wherein the machine learning classification model comprises at least one of a neural network and a support vector machine, and wherein the context of the real-time conversation includes at least two of a priority associated with a role of the user, an urgency of the real-time conversation, and a summary of the real-time conversation;
upon determining that the virtual assistant is incapable of answering the question, switching, by the application, from designating the virtual assistant to designating a non-virtual assistant to answer the question, wherein the switching is performed in absence of any request to switch, wherein the switching is performed without any notification that a switch has occurred, wherein the proposed response is preempted from being output, and wherein the determination that the virtual assistant is incapable is based on the at least two of the priority, the urgency, and the summary; and
upon determining that the non-virtual assistant has answered the question within a time limit, designating the virtual assistant to answer a subsequent question from the user;
wherein the application is configured to, upon determining that the non-virtual assistant has not answered the question within the time limit, output the preempted, proposed response.

2. The computer-implemented method of claim 1, wherein the application is configured to output a modified response from the non-virtual assistant.

3. The computer-implemented method of claim 1, wherein the application is configured to output the proposed response upon approval by the non-virtual assistant.

4. The computer-implemented method of claim 1, wherein the machine learning classification model comprises the neural network and the support vector machine.

5. The computer-implemented method of claim 1, further comprising continuously monitoring the real-time conversation and storing the real-time conversation in a chat log.

6. The computer-implemented method of claim 1, further comprising outputting a message that additional time is required to provide an answer.

7. The computer-implemented method of claim 1, wherein evaluating the proposed response comprises:
determining the priority, associated with the role of the user, from a pre-defined configuration; and
determining the urgency of the real-time conversation from a quality of the real-time conversation.

8. A system to manage a real-time conversation, the system comprising:
a user interface configured to receive a question from a user and provide a corresponding answer;
a virtual assistant, coupled to the user interface, to generate a proposed response to the question when the virtual assistant is designated to answer the question, wherein the virtual assistant is trained using machine learning; and
a conversation evaluator, coupled to the virtual assistant and to the user interface, configured to:
receive the proposed response generated by the virtual assistant;
prior to outputting the proposed response, evaluate, in real time using a machine learning classification model, the proposed response in a context of the real-time conversation to determine if the virtual assistant is incapable of answering the question, wherein the machine learning classification model comprises at least one of a neural network and a support vector machine, and wherein the context of the real-time conversation includes at least two of a priority associated with a role of the user, an urgency of the real-time conversation, and a summary of the real-time conversation;
upon determining that the virtual assistant is incapable of answering the question, switch from designating the virtual assistant to designating a non-virtual assistant to answer the question, after which the question is answered, wherein the switching is performed in absence of any request to switch, wherein the switching is performed without any notification that a switch has occurred, wherein the proposed response is preempted from being output, and wherein the determination that the virtual assistant is incapable is based on the at least two of the priority, the urgency, and the summary;

upon determining that the non-virtual assistant has answered the question within a time limit, designate the virtual assistant to answer a subsequent question from the user; and upon determining that the non-virtual assistant has not answered the question within the time limit, output the preempted, proposed response.

9. The system of claim 8, wherein the conversation evaluator is further configured to, in response to an indication from the non-virtual assistant, take further action in the real-time conversation.

10. The system of claim 8, further comprising a memory, in which is stored:

the machine learning classification model;

one or more user profiles generated for users of the system; and one or more chat logs that record past chats between users and a plurality of virtual assistants including the virtual assistant.

11. The system of claim 8, wherein to evaluate the proposed answer further comprises:

determine the priority, associated with the role of the user, from a pre-defined configuration; and determine the urgency of the real-time conversation from a quality of the real-time conversation.

12. The system of claim 11, wherein:

the urgency of the real-time conversation is higher the higher the probability of dissatisfaction with one of:
the proposed response, or
the proposed response in the context of the last few responses from the virtual assistant.

13. A computer program product to manage a real-time conversation, the computer program product comprising:

a computer-readable storage medium having computer-readable program code embodied therewith, the computer-readable program code executable by one or more computer processors to:

designate a virtual assistant to answer a question received from a user, wherein the virtual assistant is trained using machine learning;

receive a proposed response generated by the virtual assistant;

prior to outputting the proposed response, evaluate, in real time using a machine learning classification model, the proposed response in a context of the real-time conversation to determine if the virtual assistant is incapable of answering the question, wherein the machine learning classification model comprises at least one of a neural network and a support vector machine, and wherein the context of the real-time conversation includes at least two of a priority associated with a role of the user, an urgency of the real-time conversation, and a summary of the real-time conversation;

upon determining that the virtual assistant is incapable of answering the question, switch from designating the virtual assistant to designating a non-virtual assistant to answer the question, wherein the switching is performed in absence of any request to switch, wherein the switching is performed without any notification that a switch has occurred, wherein the proposed response is preempted from being output, and wherein the determination that the virtual assistant is incapable is based on the at least two of the priority, the urgency, and the summary; and upon determining that the non-virtual assistant has answered the question within a time limit, designate the virtual assistant to answer a subsequent question from the user;

wherein the computer-readable program code is configured to, upon determining that the non-virtual assistant has not answered the question within the time limit, output the preempted, proposed response.

14. The computer program product of claim 13, wherein the computer-readable program code is further executable to:

output a modified response from the non-virtual assistant.

15. The computer program product of claim 13, wherein the machine learning classification model comprises the neural network and the support vector machine.

16. The computer program product of claim 13, wherein the computer-readable program code is further executable to output a message that additional time is required to provide an answer.

17. The computer-implemented method of claim 1, wherein the application is configurable to extend the time limit up to a specified number of times before outputting the preempted, proposed response, and wherein each time that the time limit is extended, the application is configured to output a message that additional time is required to provide an answer.

18. The computer-implemented method of claim 17, wherein the urgency is determined based on a complexity of the question, a presence of one or more complaints of the user in the real-time conversation, and an unfamiliarity of the virtual assistant with the question;

wherein the priority is determined based on whether the user is in an executive role and based further on whether the user has a history that includes one or more purchases.

19. The computer-implemented method of claim 18, wherein the summary is dynamically generated based on the real-time conversation and without requiring user intervention;

wherein the virtual assistant is of a plurality of virtual assistants trained using machine learning, and wherein the machine learning classification model comprises the neural network and the support vector machine.

20. The computer program product of claim 13, wherein the computer-readable program code is configurable to extend the time limit up to a specified number of times before outputting the preempted, proposed response, and wherein each time that the time limit is extended, the computer-readable program code is configured to output a message that additional time is required to provide an answer.

\* \* \* \* \*